United States Patent
Evans et al.

(10) Patent No.: US 12,215,624 B1
(45) Date of Patent: Feb. 4, 2025

(54) FLUIDIC COMPRESSOR INLET GUIDE VANE

(71) Applicant: RTX CORPORATION, Farmington, CT (US)

(72) Inventors: Simon W. Evans, Farmington, CT (US); Brandon M. Evans, San Antonio, TX (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/512,388

(22) Filed: Nov. 17, 2023

(51) Int. Cl.
*F02C 7/16* (2006.01)
*F02C 3/06* (2006.01)
*F02C 3/30* (2006.01)

(52) U.S. Cl.
CPC .................. *F02C 7/16* (2013.01); *F02C 3/06* (2013.01); *F02C 3/30* (2013.01); *F05D 2220/323* (2013.01); *F05D 2260/212* (2013.01); *F05D 2270/08* (2013.01)

(58) Field of Classification Search
CPC .......... F02C 3/305; F02C 7/1435; F02C 3/30; F02C 7/16; F05D 2260/211; F05D 2260/212; F05D 2220/323; F05D 2270/08
See application file for complete search history.

(56) References Cited

U.S. PATENT DOCUMENTS

| | | | | |
|---|---|---|---|---|
| 2,447,696 A | * | 8/1948 | Forsyth | F02C 3/30 60/264 |
| 2,686,631 A | * | 8/1954 | Jordan | F02C 7/141 60/39.53 |
| 3,100,964 A | | 8/1963 | Bevers et al. | |
| 4,569,195 A | | 2/1986 | Johnson | |
| 6,012,279 A | * | 1/2000 | Hines | F02C 7/1435 60/39.53 |
| 6,467,252 B1 | * | 10/2002 | Payling | F02C 7/1435 60/39.53 |
| 7,272,933 B2 | * | 9/2007 | Reale | F02C 3/305 60/39.53 |
| 9,074,533 B2 | | 7/2015 | Hiller | |
| 2002/0083713 A1 | | 7/2002 | Loebig et al. | |
| 2002/0112465 A1 | * | 8/2002 | Payling | F02C 7/224 60/39.53 |
| 2018/0135518 A1 | * | 5/2018 | Moniz | F02C 3/30 |

FOREIGN PATENT DOCUMENTS

FR   3073002 B1   11/2020

* cited by examiner

*Primary Examiner* — David P. Olynick
(74) *Attorney, Agent, or Firm* — Carlson, Gaskey & Olds, P.C.

(57) ABSTRACT

A propulsion system for an aircraft includes an intercooling system configured to inject water into a compressor section to reduce a temperature of a core airflow within the core flow path. The intercooling system includes a plurality of injectors for injecting water at a water injection angle relative to an airflow to generate a defined swirl of a combined airflow and water to the compressor section.

19 Claims, 6 Drawing Sheets

FLUIDIC COMPRESSOR INLET GUIDE VANE

TECHNICAL FIELD

The present disclosure relates generally to an intercooled turbine engine where water is injected into a compressor section.

BACKGROUND

Reduction and/or elimination of carbon emissions generated by aircraft operation is a stated goal of aircraft manufacturers and airline operators. Gas turbine engines compress incoming core airflow, mix the compressed airflow with fuel that is ignited in a combustor to generate a high energy exhaust gas flow. Inlet guide vanes are utilized to set an angle of air flow into compressor sections. The angle of airflow may vary based on engine operating points. Gaps around movable inlet guide vanes generate secondary losses that reduce overall compressor efficiency.

Turbine engine manufacturers continue to seek further improvements to engine performance including improvements to reduce environmental impact while improving propulsive efficiencies.

SUMMARY

A propulsion system for an aircraft according to an exemplary embodiment of this disclosure includes, among other possible things, a core engine that includes a core flow path where air is compressed in a compressor section, communicated to a combustor section, mixed with fuel, and ignited to generate a high energy gas flow that is expanded through a turbine section. The compressor section includes a low pressure compressor that is upstream of a high pressure compressor. An intercooling system is configured to inject water into the compressor section to reduce a temperature of a core airflow within the core flow path. The intercooling system includes a plurality of injectors for injecting water at a water injection angle relative to an airflow to generate a defined swirl of a combined airflow and water to the compressor section.

In a further embodiment of the foregoing propulsion system, each of the plurality of injectors are movable to adjust the water injection angle relative to the airflow.

In a further embodiment of any of the foregoing propulsion systems, a mass of water through each of the plurality of injectors is variable to adjust the defined swirl of the combined airflow and water into the compressor section.

In a further embodiment of any of the foregoing propulsion systems, the water injection angle includes a circumferential component and an axial component.

In a further embodiment of any of the foregoing propulsion systems, the water injection angle for each of the plurality of injectors is the same.

In a further embodiment of any of the foregoing propulsion systems, the water injection angle for at least one of the plurality of injectors varies relative to others of the plurality of injectors.

In a further embodiment of any of the foregoing, the propulsion system includes a synchronization assembly to which the plurality of injectors is attached. The synchronization assembly is actuatable to vary the water injection angle.

In a further embodiment of any of the foregoing, the propulsion system further includes an annular passage for directing an airflow from an exit of the low pressure compressor to an inlet of the high pressure compressor. The plurality of injectors is disposed within the annular passage for generating the defined swirl of the combined airflow and water through the annular passage to the inlet of the high pressure compressor.

In a further embodiment of any of the foregoing propulsion systems, the plurality of injectors are spaced circumferentially apart about an outer radial surface of the annular passage.

In a further embodiment of any of the foregoing propulsion systems, the plurality of injectors are spaced circumferentially apart about an inner radial surface of the annular passage.

In a further embodiment of any of the foregoing propulsion systems, the plurality of injectors are spaced circumferentially apart about both an inner radial surface and an outer radial surface of the annular passage.

In a further embodiment of any of the foregoing, the propulsion system further includes a plurality of exit guide vanes within the annular passage for directing airflow from the exit of the low pressure compressor. The plurality of injectors are mounted to corresponding ones of the plurality of exit guide vanes.

In a further embodiment of any of the foregoing propulsion systems, each of the plurality of injectors are movable relative to the corresponding ones of the plurality of exit guide vanes for adjusting the water injection angle.

In a further embodiment of any of the foregoing, the propulsion system further includes a condenser that is arranged along the core flow path and configured to extract water from the high energy gas flow and an evaporator that is configured to receive a portion of the water that is extracted by the condenser to generate a steam flow. The steam flow is injected into the core flow path upstream of the turbine section.

An intercooling system for a turbine engine according to another exemplary embodiment of this disclosure includes, among other possible things, a condenser that is arranged along a core flow path and configured to extract water from an exhaust gas flow, a pump where water from the condenser is pressurized, and a plurality of injectors where a pressurized water flow is injected into the core flow path within a compressor section. The plurality of injectors are movable to vary a water injection angle relative to an inlet airflow and generate a defined swirl of a combined airflow and water to an inlet of the compressor section.

In a further embodiment of the foregoing, the intercooling system includes a synchronization ring to which the plurality of injectors are attached. The synchronization ring is movable to vary the water injection angle.

In a further embodiment of any of the foregoing intercooling systems, the compressor section includes a low pressure compressor that is upstream of a high pressure compressor with an annular passage for directing an airflow from an exit of the low pressure compressor to an inlet of the high pressure compressor. The plurality of injectors are spaced circumferentially apart about at least one of an outer radial surface and an inner radial surface of the annular passage.

In a further embodiment of any of the foregoing, the intercooling system further includes a plurality of exit guide vanes within the annular passage for directing airflow from the exit of the low pressure compressor. The plurality of injectors are mounted to corresponding ones of the plurality of exit guide vanes.

A method of operating a compressor section of a turbine engine according to another exemplary embodiment of this disclosure includes, among other possible things, generating a pressurized airflow through a first compressor section, injecting a pressurized water flow at a water injection angle relative to the pressurized airflow that is generated in the first compressor section to generate a combined pressurized air and water flow with a resultant swirl angular flow component, communicating the combined pressurized air and water flow to a second compressor section downstream of the first compressor section, and varying the water injection angle based on an engine operating point.

In a further embodiment of the foregoing, the method further includes adjusting a pressure of water that is injected to vary the resultant swirl angular flow component.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
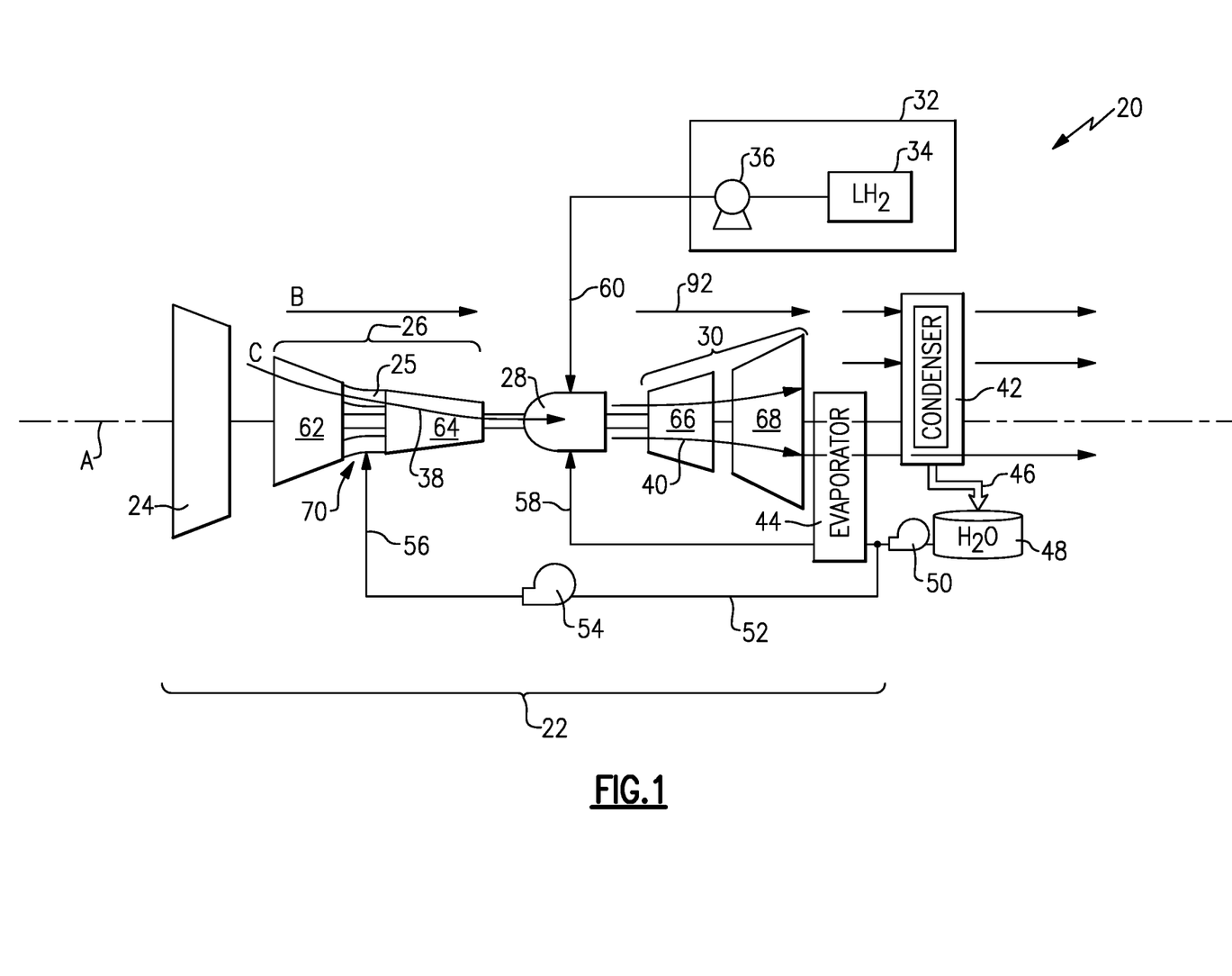
FIG. 1 is a schematic view of an example propulsion system embodiment.

FIG. 1 schematically illustrates an example propulsion system 20 that includes an intercooling system 25 that provides an intercooling waterflow that provides cooling and that is injected in a manner and direction that results in an angle of a combined air and water flow into an inlet of a high pressure compressor section.

The example propulsion system 20 is a hydrogen steam injected inter-cooled turbine engine with a core engine 22. The core engine 22 includes a core airflow path C through a fan 24, a compressor section 26, a combustor 28 and a turbine section 30 arranged along an engine longitudinal axis A. A fuel system 32 includes a hydrogen ($H_2$) fuel storage tank 34 and a fuel pump 36 to generate a fuel flow 60. The fan 24 drives inlet air as a core flow 38 into the compressor section 26. In the compressor section 26, the core flow 38 is compressed and communicated to the combustor 28. In the combustor 28, the core flow 38 is mixed with the hydrogen ($H_2$) fuel flow 60 and ignited to generate a high energy gas flow 40 that expands through the turbine section 30 where energy is extracted and utilized to drive the fan 24 and the compressor section 26. A bypass flow 92 may flow through the fan 24 and a bypass flow path B around the remaining components of the core engine 22.

The high energy gas flow 40 is exhausted from the turbine section 30 and communicated through a condenser 42 and an evaporator 44. The condenser 42 cools a portion of the exhaust gas flow 40 to extract water 46 that is stored in a tank 48. A pump 50 moves water through the evaporator 44. In the evaporator 44, heat from the exhaust gas flow 40 is used to transform at least a portion of water into a steam flow 58. The steam flow 58 is injected into the combustor 28 or other locations within the core flow path C.

The example core engine 22 has an increased power output from the injected steam due to an increasing mass flow through the turbine section 30 without a corresponding increase in work from the compressor section 26. An example engine operation cycle may include up to (or more than) 35% steam-air-ratios (SAR) and may be assisted by a multiple fold (e.g., 2×, 3×, etc.) increase in moisture from burning $H_2$ as the fuel.

The intercooling system 25 provides an intercooling flow of water 52 may be communicated to the compressor section 26 to reduce a temperature of the core airflow 26 and increase mass flow. Reduced temperatures and increased mass flow provided by injection of water increases compressor efficiency. Longer resident times for the injected water are desirable to maximize the amount of water evaporated, that in turn, maximizes cooling of the pressurized airflow within the compressor section 26.

The example compressor section 24 includes a low pressure compressor (LPC) 62 and a high pressure compressor (HPC) 64 separated by an annular passage 70. The turbine section 30 includes a high pressure turbine (HPT) 66, and a low pressure turbine (LPT) 68. The turbines 66 and 68 are coupled to a corresponding compressor section 62, 64. In this disclosed example, the HPT 66 is coupled to drive the HPC 64. The LPT 68 is coupled to drive the LPC 62 and the fan 24. In some examples, the LPT 68 may be coupled to the fan 24 via a gearbox that is configured to reduce the speed of the shaft relative to the LPT 68 and/or the LPC 62. Although the example core engine 22 is described and shown by way of example as a two-spool engine, other engine configurations and architectures may also benefit from this disclosure and are within the contemplation and scope of this disclosure.

The example intercooling system 25 includes an intercooling pump 54 that generates a pressurized intercooling water flow 56 that is injected into a location between the LPC 62 and the HPC 64. Moreover, the example intercooling system 25 provides swirling of flows between the LPC 62 and the HPC 64 to maximize cooling by increasing resident time and evaporation.

Previous compressor sections would utilize a variable inlet guide vane at the inlet to direct airflow into the HPC. Such inlet guide vanes are a potential source of efficiency losses because some airflow may leak past the inlet guide vane. Disclosed example embodiments eliminate the inlet guide vane and utilize water injection for intercooling to direct and generate desired flows into the HPC.

Figure 2:
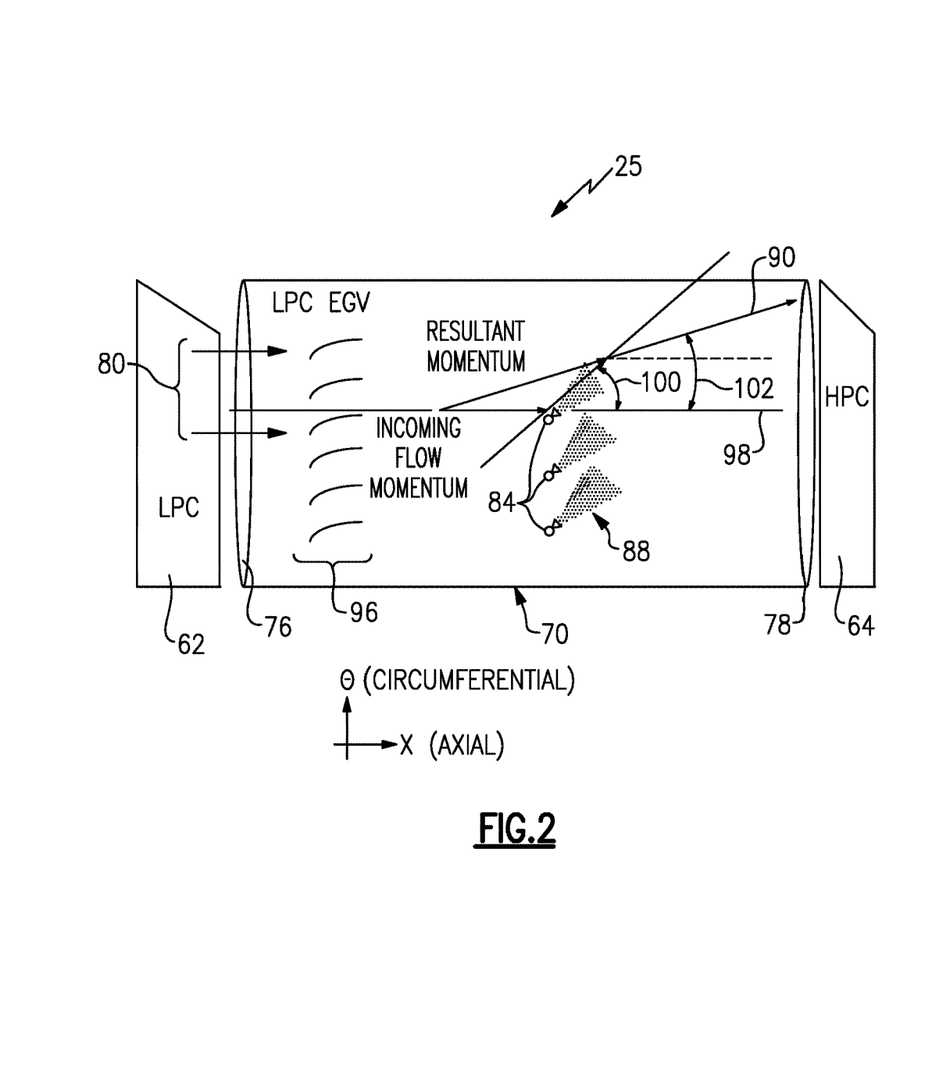
FIG. 2 is a schematic view of a portion of an example intercooling system embodiment.
Figure 3:
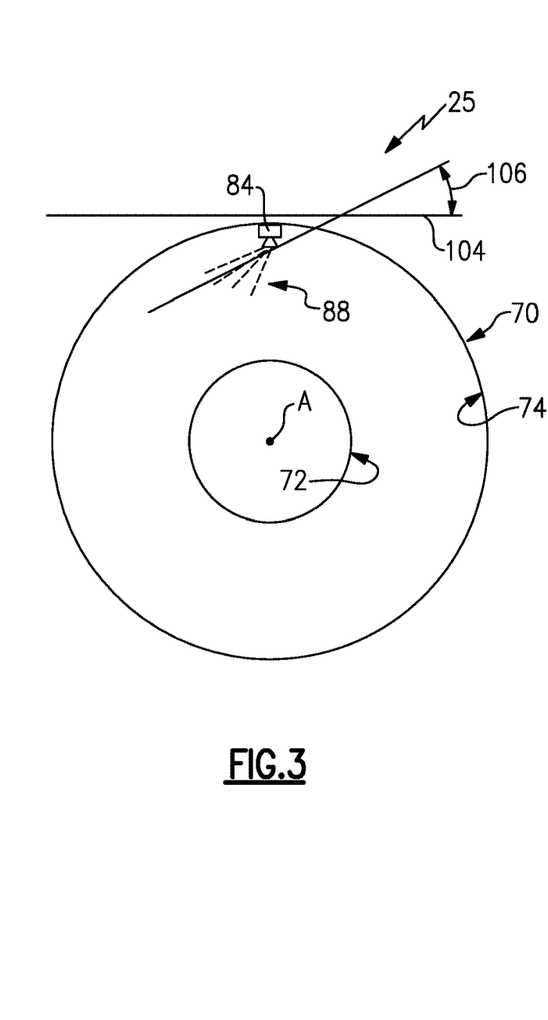
FIG. 3 is an axial schematic view of the intercooling system embodiment shown in FIG. 2.

Referring to FIGS. 2 and 3, the example intercooling system 25 is shown schematically and provides for water 88 to be injected into the passage 70 through one or more injectors 84. Pressurized airflow 80 through an exit 76 of the LPC 62 is communicated through the passage 70 to an inlet 78 for the HPC 64. An angle of the pressurized airflow 80 through the inlet 78 is determined first by the exit guide vanes 96. The exit guide vanes 96 straighten the airflow 80 for introduction into the passage 70. The direction of the airflow 80 is modified by the direction of injected intercooling waterflow 88 to generate a combined water and air flow indicated at 90 in a resultant direction. The resultant direction is different than either the direction of the airflow 80 and the injection of the water flow 88. The direction of the combined air and water flow 90 through the inlet 78 to the HPC 64 is varied to provide a desired compressor efficiency. The angle and condition of airflow into the HPC 64 influences compressor efficiency and is tailored to correspond with engine operating conditions.

Accordingly, the pressurized airflow 80 enters through the LPC exit 76 along a flow axis 98. The example flow axis 98 is parallel to the engine longitudinal axis A. The intercooling waterflow 88 is injected along an injector axis that is disposed at an injector angle 100 relative to the flow axis 98. The injector angle 100 and a momentum of the injected intercooling waterflow 88 result in the combined flow 90 proceeding in a resultant direction that is disposed at an angle 102 relative to the flow axis 98.

Additionally, the injectors 84 may be angled circumferentially relative to a tangent line 104 to induce a swirl component to the combined flow 90. FIG. 3 illustrates injection of the intercooling water flow 88 at a circumferential angle 106 to the tangent line 104. Accordingly, the orientation of the injector 84 may be varied both relative to the flow axis 98 and the tangent line 104 to generate the desired direction of the combined flow 90 to the HPC inlet 78, In one example embodiment, the injector angle 100 may vary between 90 degrees and 25 degrees relative to the flow axis 98. In another disclosed example the injector angle may vary between about 30 and 90 degrees relative to the flow axis 98. The circumferential angle 106 may similarly vary between 0 and 90 degrees. It should be appreciated that although example angles are disclosed by way of example, other angles that generate a desired flow profile into the HPC inlet 78 may be utilized and are within the contemplation and scope of this disclosure.

The example injectors 84 are schematically shown and may be of any configuration that provides the intercooling waterflow 88 into the passage 70. Moreover, the injectors 84 may provide proportional control of the volume of water injected or may be configured as fully on or fully off devices. Moreover, the disclosed system is shown schematically and would include a system of conduits, manifolds and valving required to supply and control the supply of pressurized intercooling water 56 to each of the injectors 84.

Figure 4:
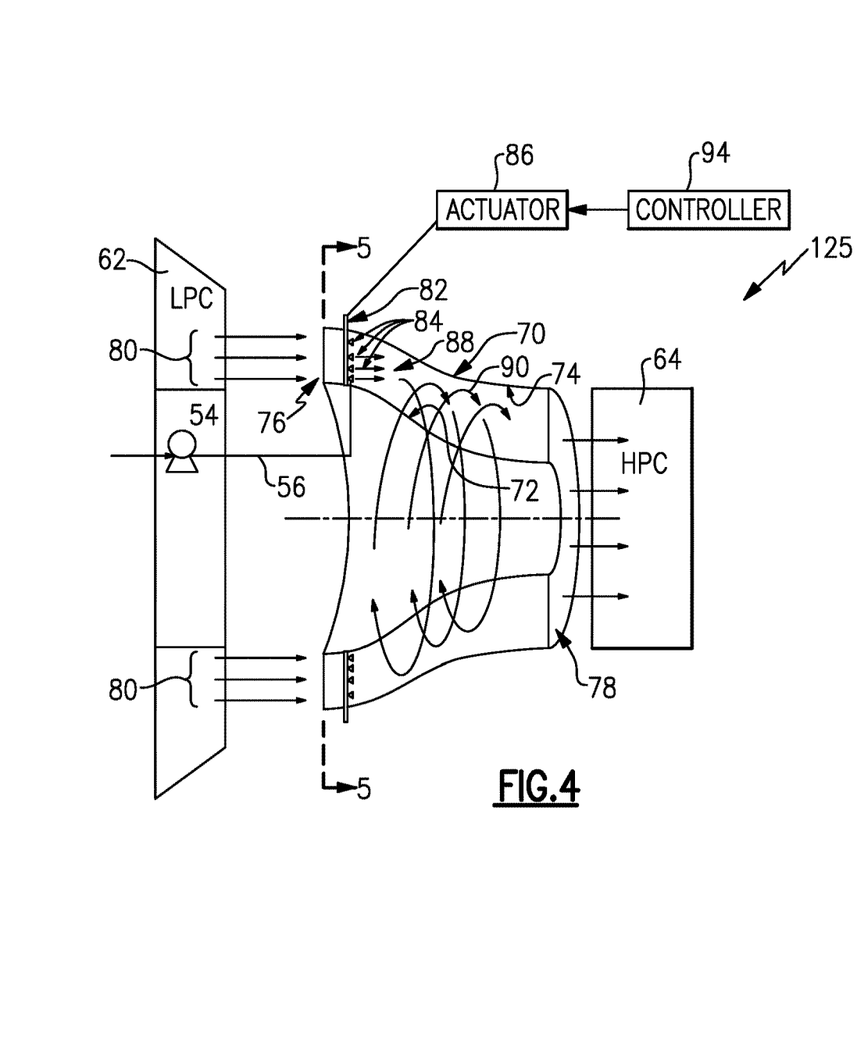
FIG. 4 is a schematic view of another example intercooling system embodiment.
Figure 5:
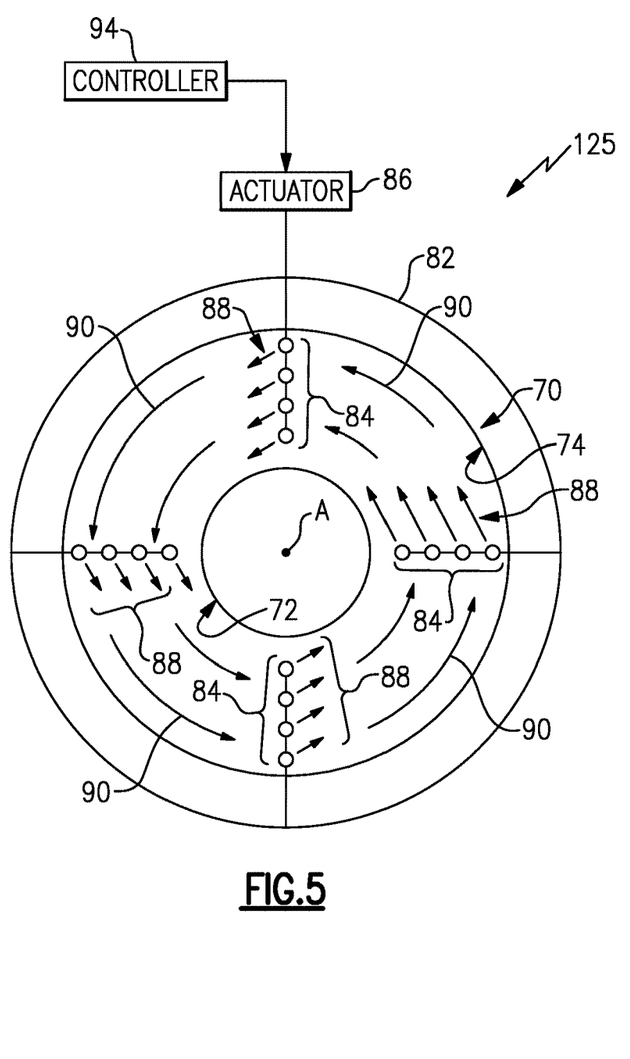
FIG. 5 is an axial schematic view of the intercooling system embodiment shown in FIG. 4.

Referring to FIGS. 4 and 5, an example intercooling system 125 embodiment is schematically shown and includes a plurality of injectors 84 mounted to a synchronization assembly schematically indicated at 82. The synchronization assembly 82 is coupled to an actuator 86 that is controlled by a controller 94. The controller 94 commands operation of the actuator 86 based on engine operating information to change a direction at which the intercooling water flow 56 is injected into the passage 70. The direction of injection of the intercooling water flow 88 is based on the incoming airflow 80 to provide a resultant direction of the combined air and water flow to the inlet 78. The passage 70 is shown schematically in FIGS. 4 and 5 and illustrates the intercooling water flow 88 injected relative to the inlet airflow 80 to provide the resultant combined flow that is schematically indicated by arrows 90. The resultant flow 90 is in a direction desired for input into the HPC 64.

The injectors 84 are arranged at circumferentially spaced intervals between an inner surface 72 and an outer surface of the passage 70. In the disclosed example, four groups of injection injectors 84 are shown, however, other numbers and groups of injectors 84 may be utilized and are within the scope and contemplation of this disclosure.

Moreover, the controller 94 may be programmed to operate each of the plurality of injectors 84 to vary a mass flow of water injected into the passage 70. The mass flow of water may be injected at varying amounts based on a position within the passage 70. In one example embodiment, the mass flow of water through each of the plurality of injectors 84 is individually varied to adjust and induce a desired swirl of the combined airflow and water flow into the HPC 64. Additionally, the mass flow of water may be varied based on a circumferential position, a radial position or location to another structure. Although examples of how the mass flow of water may be varied, other operational variations in mass flow of water based on other criteria may be utilized and are within the contemplation and scope of this disclosure.

Furthermore, variations in the mass flow of water between the plurality of injectors 84 may be controlled and varied during an operational cycle of the propulsion system 20. For example, a first sequence of water flow through each of the injectors 84 may be utilized during take-off conditions and changed once a cruise operating condition is entered. Moreover, the mass flow of water may be varied based on real-time information indicative of engine operation. Although several example operating examples are disclosed, other operational criteria could be utilized to control and vary the mass flow of water through each of the plurality of injectors 84 and is within the contemplation and scope of this disclosure.

Figure 6:
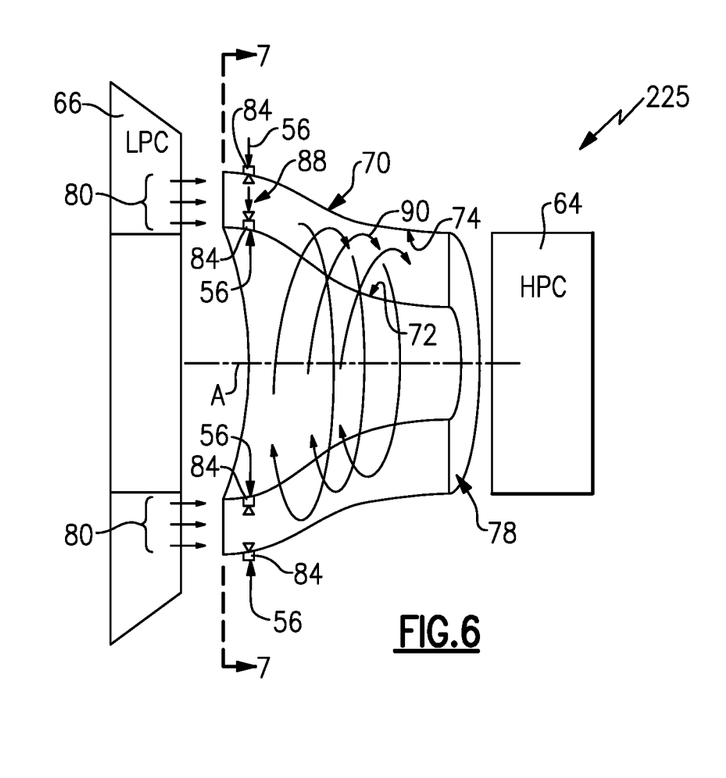
FIG. 6 is a schematic view of yet another example intercooling system embodiment.
Figure 7:
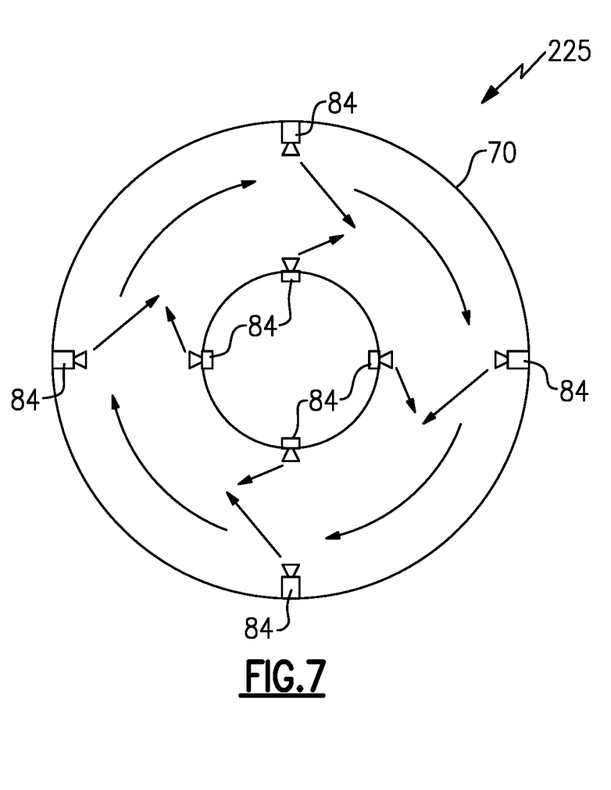
FIG. 7 is an axial schematic view of the intercooling system embodiment shown in FIG. 6.

Referring to FIGS. 6 and 7, another example intercooling system embodiment 225 includes an injector configuration that is schematically shown and includes injectors 84 disposed at circumferential intervals on both the inner radial surface 72 and outer radial surface 74 of the passage 70. The injectors 84 may be operated individually or together to inject the intercooling waterflow 88 into the passage 70. The number and location of the injectors 84 may be varied to provide sufficient intercooling water flow 88 to both cool the compressed airflow 80 and to generate the flow direction desired in the common flow 90 that is communicated to the HPC 68.

Figure 8:
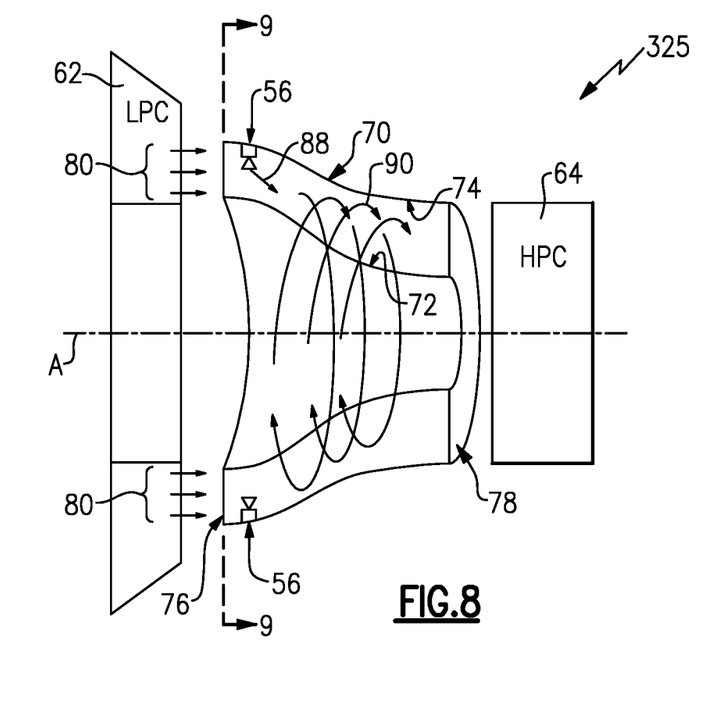
FIG. 8 is a schematic view of still another example intercooling system embodiment.
Figure 9:
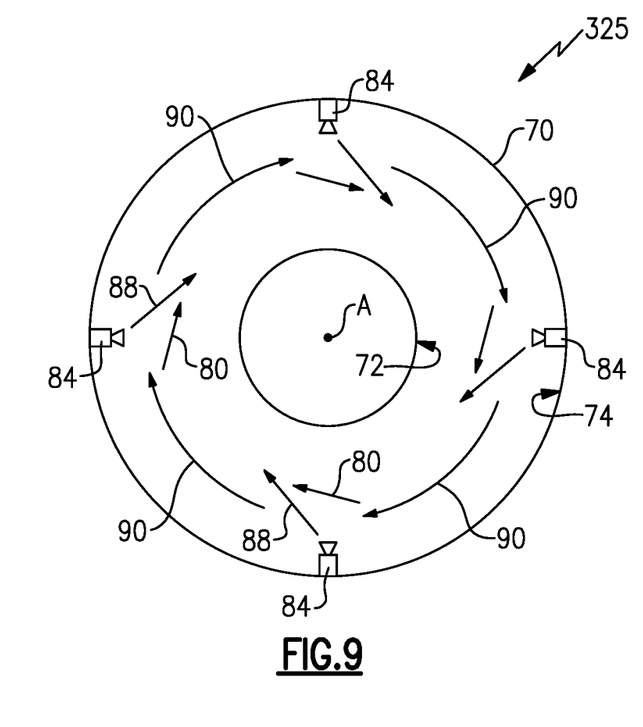
FIG. 9 is an axial schematic view of the intercooling system embodiment shown in FIG. 8.

Referring to FIGS. 8 and 9, another example intercooling system 325 embodiment includes an injector configuration schematically shown that includes injectors 84 disposed about only the radially outer surface 74. The injectors 84 inject the intercooling water flow 88 relative to the incoming airflow 80 from the LPC 62. The resultant direction of the combined flow 90 provides the swirl and flow direction desired for introduction into the HPC 64. The direction at which the injectors 84 introduce the intercooling waterflow 88 varies based on engine operating conditions.

Figure 10:
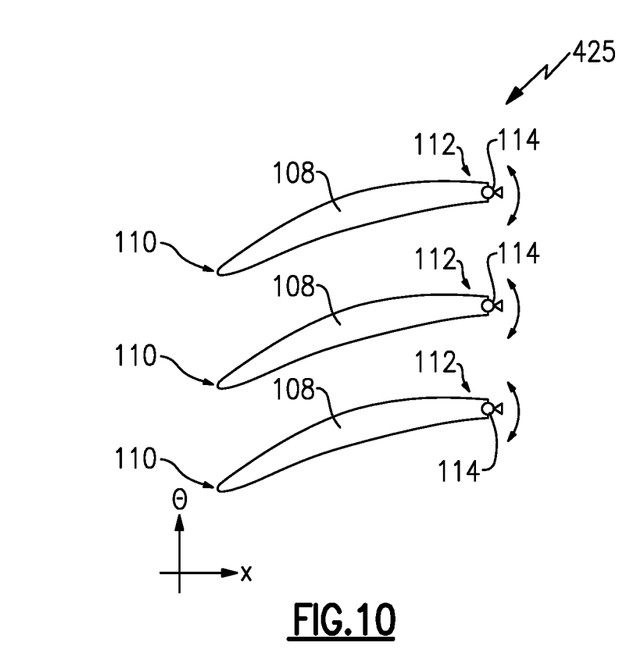
FIG. 10 is a schematic view of an additional example intercooling system embodiment.
Figure 11:
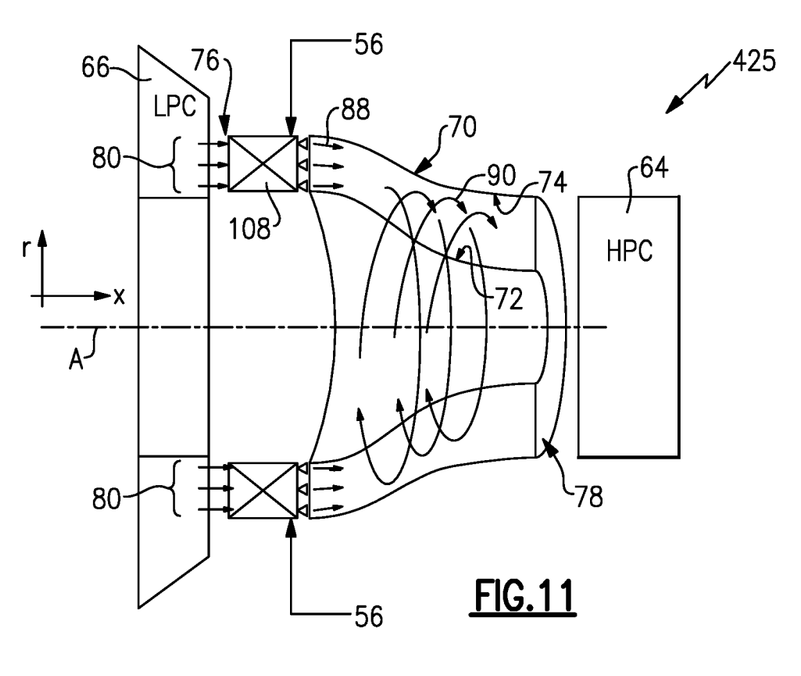
FIG. 11 is an axial schematic view of the intercooling system embodiment shown in FIG. 10.

Referring to FIGS. 10 and 11, another example intercooling system 425 embodiment includes an injector configuration that is schematically shown and includes injectors 114 mounted to exit guide vanes 108. The exit guide vanes 108 condition airflow from the LPC 62 and include a leading edge 110 and a trailing edge 112. At least one injector 114 is mounted proximate the trailing edge 112 of each of the exit guide vanes 108. The example exit guide vanes 108 are fixed and the injectors 84 are actuatable to alter a direction in which the intercooling water flow 88 is injected. In the disclosed example embodiment, each of the exit guide vanes 108 includes a plurality of injectors 114 spaced radially apart between the inner radial surface 72 and the outer radial surface 74 of the passage 70. Additionally, although each of the exit guide vanes 108 are disclosed by way of example as including at least one injector 114, not all of the exit guide vanes 108 need to have an injector 114.

Accordingly, a direction and angle at which the injectors 84 direct water 88 into the passage 70 is varied to generate a defined swirl of a combined air and water flow as is schematically shown by arrows 90. The defined swirl provides the desired flow into the HPC 64 and increases resident time of water to maximize cooling evaporation.

Although an example engine configuration is described by way of example, it will be appreciated that other engine configurations may include additional structures and features and are within the contemplation and scope of this disclosure.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A propulsion system for an aircraft comprising:
a core engine including a core flow path where air is compressed in a compressor section, communicated to a combustor section, mixed with fuel, and ignited to generate a high energy gas flow that is expanded through a turbine section, wherein the compressor section includes a low pressure compressor upstream of a high pressure compressor and an annular passage for directing an airflow from an exit of the low pressure compressor to an inlet of the high pressure compressor; and
an intercooling system configured to inject water into the compressor section to reduce a temperature of a core airflow within the core flow path, wherein the intercooling system includes a plurality of injectors for injecting water at a water injection angle relative to an airflow to generate a defined swirl of a combined airflow and water to the compressor section and an actuator, coupled to at least one of the plurality of injectors, configured to move the one injector to change the water injection angle of the one at least one injector.

2. The propulsion system as recited in claim 1, wherein each of the plurality of injectors are movable independent of rotating portions of the compressor section to adjust the water injection angle relative to the airflow.

3. The propulsion system as recited in claim 2, wherein a mass of water through each of the plurality of injectors is variable to adjust the defined swirl of the combined airflow and water into the compressor section.

4. The propulsion system as recited in claim 1, wherein the water injection angle includes a circumferential component and an axial component.

5. The propulsion system as recited in claim 1, wherein the water injection angle for each of the plurality of injectors is the same.

6. The propulsion system as recited in claim 1, wherein the water injection angle for at least one of the plurality of injectors varies relative to others of the plurality of injectors.

7. The propulsion system as recited in claim 1, including a synchronization assembly to which the plurality of injectors is attached, wherein the synchronization assembly is actuatable to vary the water injection angle.

8. The propulsion system as recited in claim 7, wherein the plurality of injectors are spaced circumferentially apart about an inner radial surface of the annular passage.

9. The propulsion system as recited in claim 7, wherein the plurality of injectors are spaced circumferentially apart about both an inner radial surface and an outer radial surface of the annular passage.

10. The propulsion system as recited in claim 7, further comprising a plurality of exit guide vanes within the annular passage for directing airflow from the exit of the low pressure compressor, wherein the plurality of injectors are mounted to corresponding ones of the plurality of exit guide vanes.

11. The propulsion system as recited in claim 10, wherein each of the plurality of injectors are movable relative to the corresponding ones of the plurality of exit guide vanes for adjusting the water injection angle.

12. The propulsion system as recited in claim 1, further comprising a condenser arranged along the core flow path and configured to extract water from the high energy gas flow and an evaporator configured to receive a portion of the water extracted by the condenser to generate a steam flow, wherein the steam flow is injected into the core flow path upstream of the turbine section.

13. A propulsion system for an aircraft comprising:
a core engine including a core flow path where air is compressed in a compressor section, communicated to a combustor section, mixed with fuel, and ignited to generate a high energy gas flow that is expanded through a turbine section, wherein the compressor section includes a low pressure compressor upstream of a high pressure compressor; and
an intercooling system configured to inject water into the compressor section to reduce a temperature of a core airflow within the core flow path, wherein the intercooling system includes a plurality of injectors for injecting water at a water injection angle relative to an airflow to generate a defined swirl of a combined airflow and water to the compressor section;
an annular passage for directing an airflow from an exit of the low pressure compressor to an inlet of the high pressure compressor, wherein the plurality of injectors is disposed within the annular passage for generating the defined swirl of the combined airflow and water through the annular passage to the inlet of the high pressure compressor; and
a synchronization assembly to which the plurality of injectors are attached, wherein the synchronization assembly is actuatable to vary the water injection angle and the plurality of injectors are spaced circumferentially apart about an outer radial surface of the annular passage.

14. An intercooling system for a turbine engine comprising:
a condenser arranged along a core flow path and configured to extract water from an exhaust gas flow;
a pump where water from the condenser is pressurized;
a plurality of injectors where a pressurized water flow is injected into the core flow path within a compressor section; and
at least one actuator coupled to the plurality of injectors and a controller,
wherein the controller is configured to control the actuator to move the plurality of injectors to vary a water injection angle relative to an inlet airflow and generate a defined swirl of a combined airflow and water to an inlet of the compressor section.

15. The intercooling system as recited in claim 14, including a synchronization ring to which the plurality of injectors are attached, wherein the synchronization ring is movable to vary the water injection angle.

16. The intercooling system as recited in claim 14, wherein the compressor section includes a low pressure compressor upstream of a high pressure compressor with an annular passage for directing an airflow from an exit of the low pressure compressor to an inlet of the high pressure compressor, wherein the plurality of injectors are spaced circumferentially apart about at least one of an outer radial surface and an inner radial surface of the annular passage.

17. The intercooling system as recited in claim 16, further comprising a plurality of exit guide vanes within the annular passage for directing airflow from the exit of the low pressure compressor, wherein the plurality of injectors are mounted to corresponding ones of the plurality of exit guide vanes.

18. A method of operating a compressor section of a turbine engine comprising:
   generating a pressurized airflow through a first compressor section;
   injecting, using at least one injector coupled to an actuator, a pressurized water flow at a first water injection angle relative to the pressurized airflow generated in the first compressor section to generate a combined pressurized air and water flow with a resultant swirl angular flow component;
   communicating the combined pressurized air and water flow to a second compressor section downstream of the first compressor section; and
   based upon an engine operating point, controlling the actuator to move the at least one injector to change the first water injection angle to a second water injection angle.

19. The method as recited in claim 18, further comprising, adjusting a pressure of water injected to vary the resultant swirl angular flow component.

* * * * *